Inventor
EDWARD F. GRAHAM, Jr.

Dec. 1, 1942.  E. F. GRAHAM, JR  2,303,545
MOTOR VEHICLE WHEEL SUSPENSION AND SHOCK ABSORPTION APPARATUS
Filed Oct. 24, 1940  4 Sheets-Sheet 3

Inventor
EDWARD F. GRAHAM, Jr.
By Clarence A. O'Brien
and Harvey B. Jacobson
Attorneys Dec. 1, 1942.  E. F. GRAHAM, JR  2,303,545
MOTOR VEHICLE WHEEL SUSPENSION AND SHOCK ABSORPTION APPARATUS
Filed Oct. 24, 1940  4 Sheets-Sheet 4
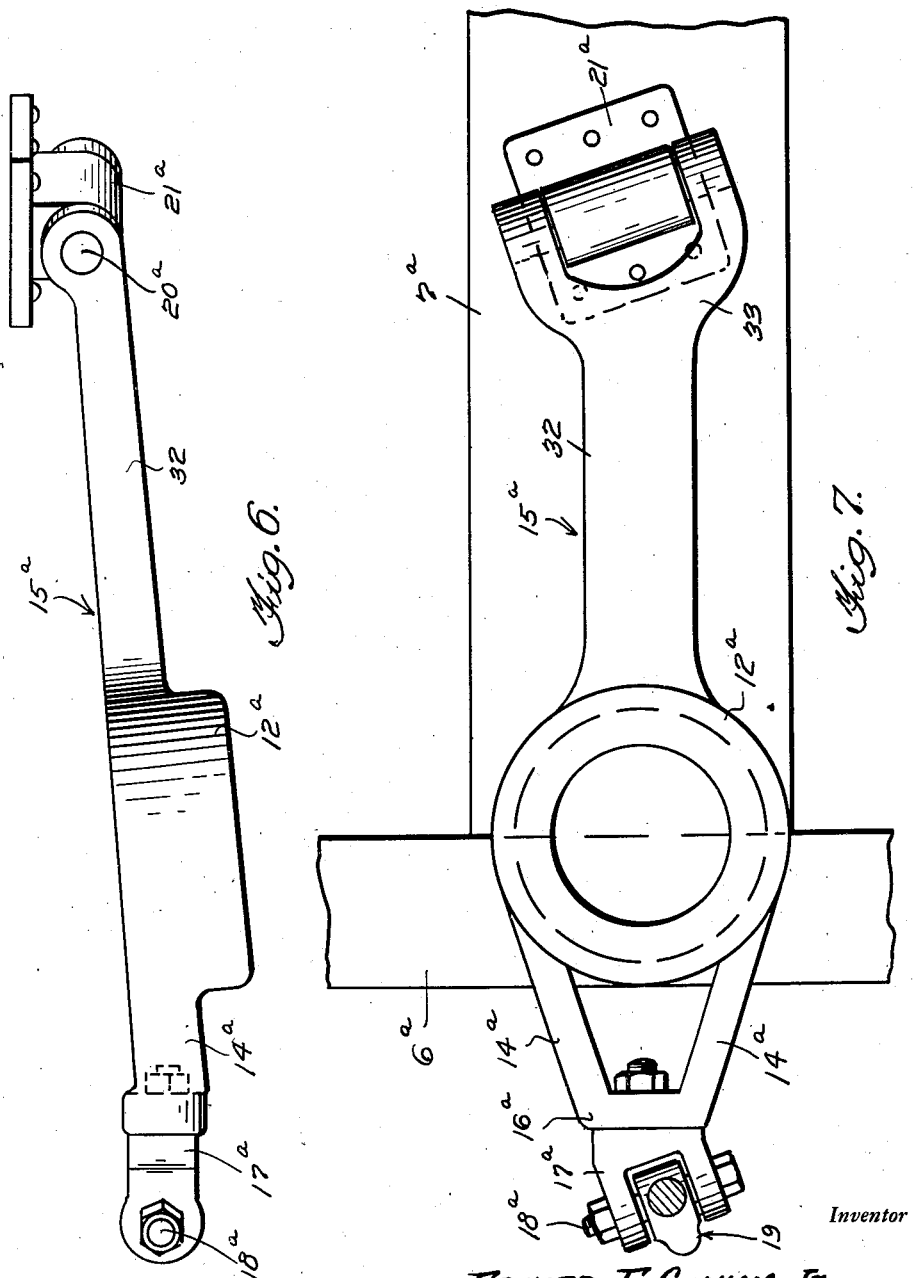
Inventor
EDWARD F. GRAHAM, JR.
By Clarence A. O'Brien
and Harvey B. Jacobson.
Attorneys Patented Dec. 1, 1942

2,303,545

UNITED STATES PATENT OFFICE 2,303,545

MOTOR VEHICLE WHEEL SUSPENSION AND SHOCK ABSORPTION APPARATUS

Edward F. Graham, Jr., McDonald, Pa.

Application October 24, 1940, Serial No. 362,639

16 Claims. (Cl. 280—124)

The invention relates to improvements in independent wheel suspensions for vehicles.

While the invention applies to both the front and rear wheels of vehicles, it is particularly concerned with the steerable wheels, usually at the front, of vehicles, the primary object of the invention being to provide for greater stability of the wheels and the chassis of the vehicle and substantially eliminate the tendency of cenrifugal force to produce swaying and sideslip of the vehicle and attendant road shock when the vehicle is operated on curves, especially at high speed, thereby making it safer and more comfortable to execute curves at high speed.

Another important object of the invention is to provide for lowering of the center of gravity of the vehicle while providing adequate road clearance.

Other important objects and advantages of the invention will be apparent from a reading of the following description and the appended drawings, wherein for purposes of illustration preferred embodiments of the invention are shown.

In the drawings:

Figure 6 is a front elevational view on a somewhat enlarged scale of an alternative form of upper level.

Figure 7 is a fragmentary bottom plan view of Figure 6.

Figure 3:
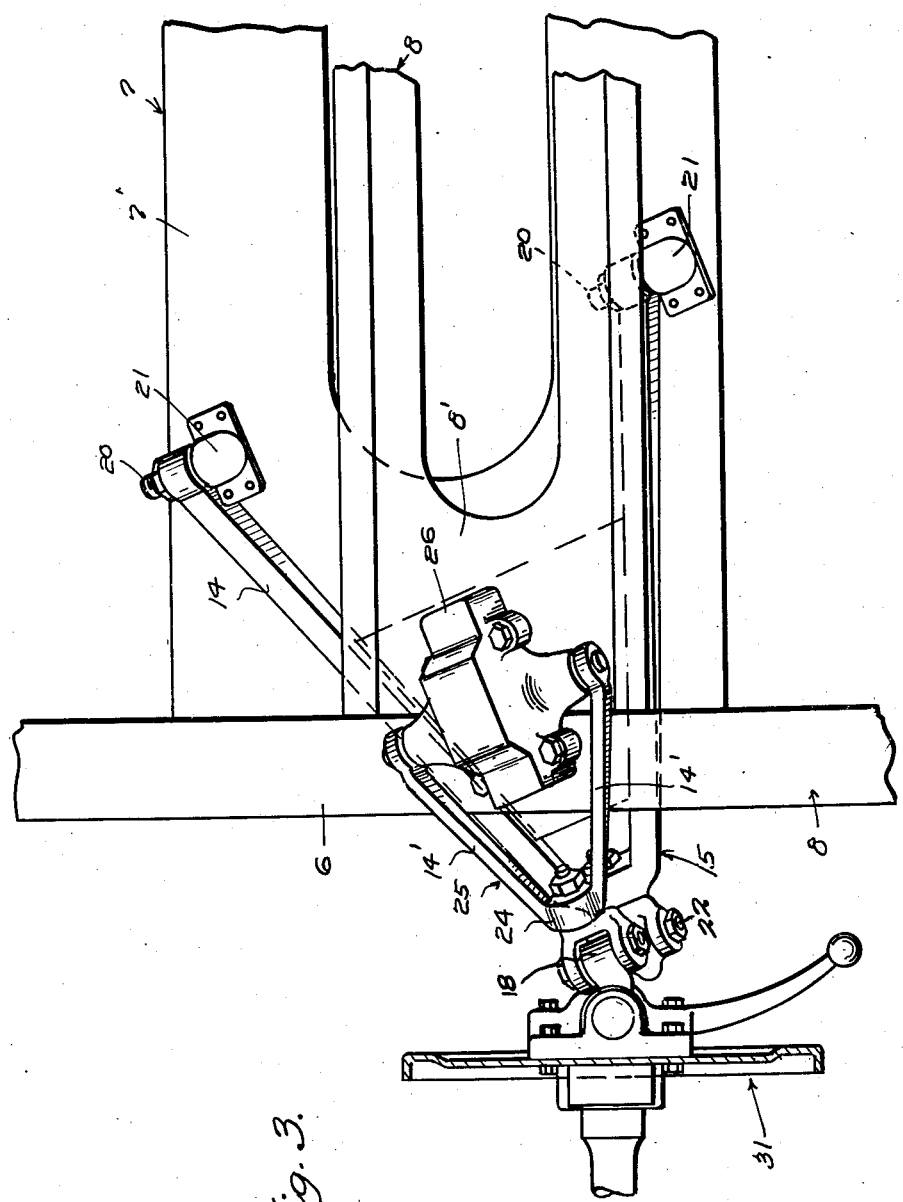
Figure 3 is a fragmentary horizontal sectional view taken on a line below the lower linkage and looking upwardly.
Figure 4:
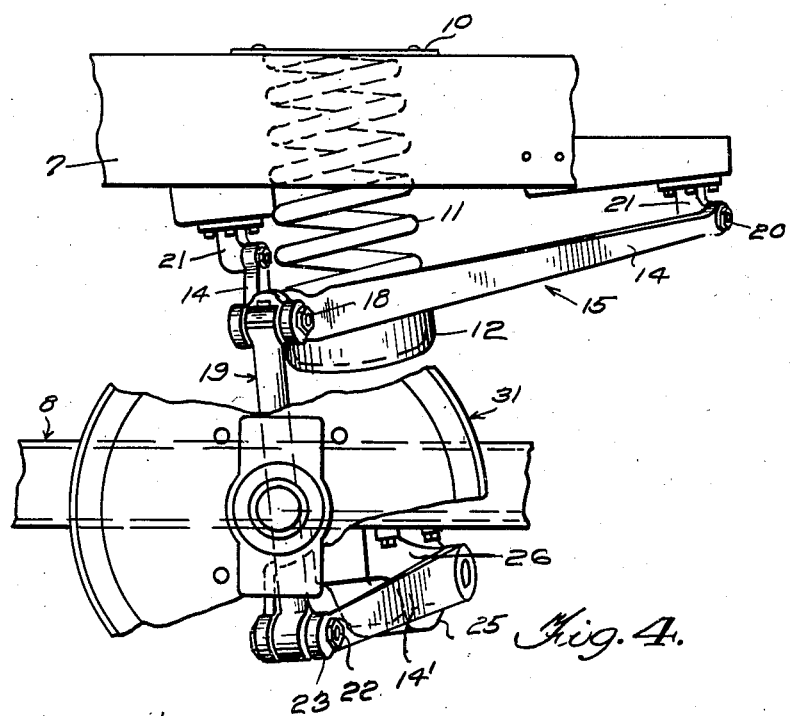
Figure 4 is a fragmentary outboard side elevational view of Figure 1 with portions of the wheel assembly broken away to show the parts of the suspension therebehind.

Referring in detail to the drawings, the numerals 5 and 6 refer to upper and lower longitudinal chassis side members which are spaced and connected adjacent their front ends by the upper and lower cross members 7 and 8, respectively, the lower cross member having the vertical transverse riser portion 9 which supports the forepart of the upper cross member 7 in vertically spaced relation to the lower cross member 8. As seen in Figure 3 of the drawings, the upper cross member 7 has a substantially horizontal plate portion 7' which is substantially wider than the substantially horizontal plate portion 8' of the lower cross member 8.

The upper chassis side member 5 has a receiver portion 10 in which is seated the upper end of the helical coil suspension spring 11 which depends below the upper cross member 7, with its lower end seated and suitably secured in the cup 12 formed in the web 13 which extends between and is secured to the side elements 14 of the wishbone upper suspension arm 15. The side elements are, as shown in the drawings, substantially equal in length and are fixed at their outer and converging ends to a yoke portion 16 in which is secured the knuckle 17 carrying the pin 18. The pin 18 rockably traverses the upper end of the spindle bracket 19.

Figures 1, 2:
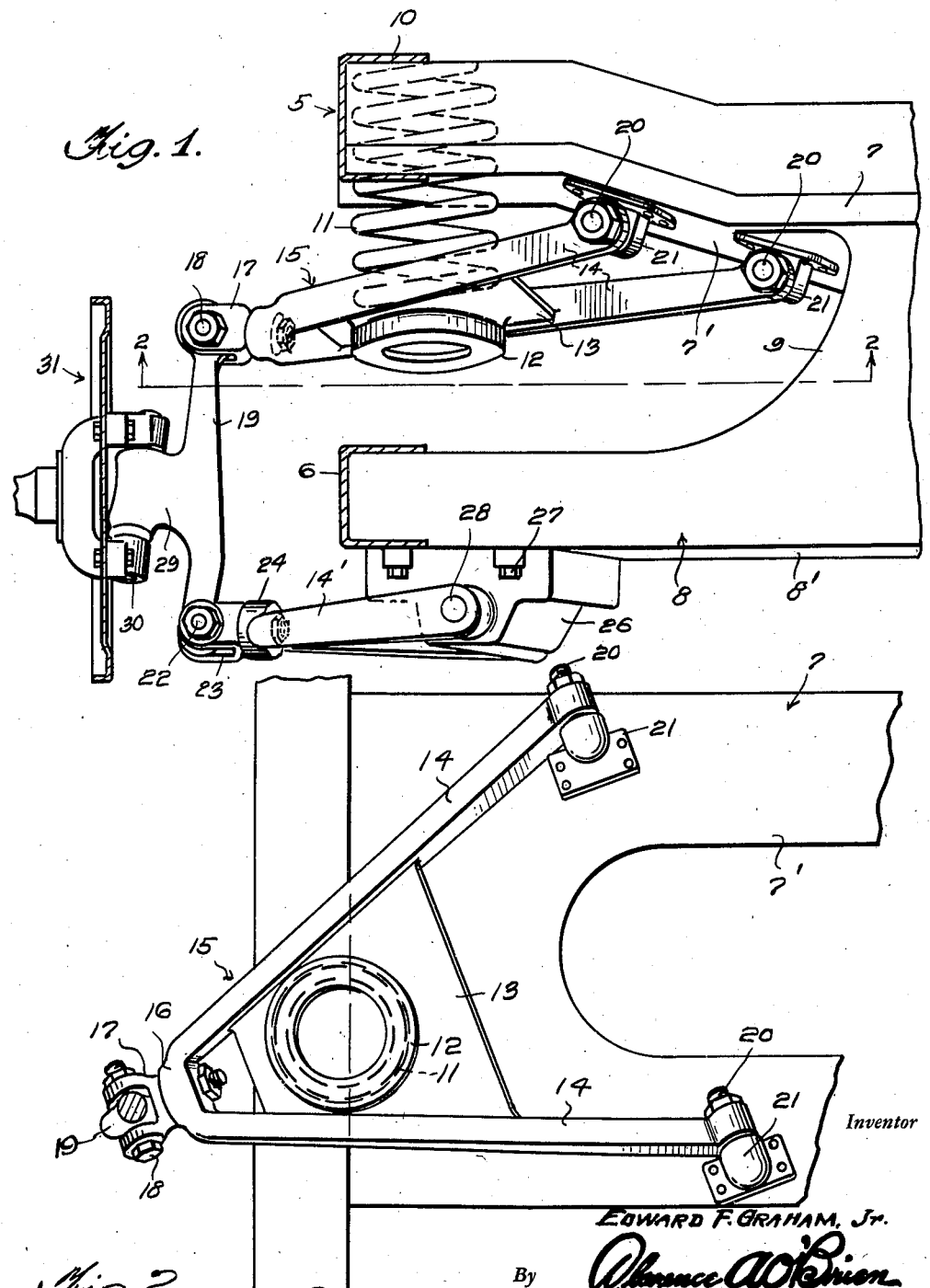
Figure 1 is a fragmentary transverse vertical sectional view through a vehicle in accordance with the present invention taken on a line forward of the right front wheel suspension and showing the right front wheel suspension in front elevation.
Figure 2 is a fragmentary horizontal sectional view taken through Figure 1 along the line 2—2 and looking upwardly in the direction of the arrows.

The inner ends of the side elements 14 are traversed by pins 20 which are axially aligned and are anchored to the bottom of the plate portion 7' of the upper cross member 7 by means of anchors 21. The common axis of the pins 20 extends diagonally with respect to the length of the chassis of the vehicle so that the upper suspension arm projects in a rearward and inward direction. In addition, the rear anchor 21 depends to a level below the front anchor so that in addition the common axis of the pins 20 declines rearwardly. As shown in Figure 1 of the drawings, the upper suspension arm 15 is substantially spaced above the lower chassis cross member 3 and normally occupies a slightly outwardly declining position, with the bifurcated knuckle 17 deflected in a substantially horizontal plane.

The lower end of the spindle bracket 19 depends substantially below the lower cross member 8 and is rockably traversed by a pin 22 which is carried by a bifurcated knuckle 23 which normally lies in a horizontal plane and is fixed to the yoke 24 joining the convergent outboard ends of the side elements 14' of the lower suspension arm 25. Like the common axis of the upper arm anchor pins 20 the axes of the pins 18 and 22 decline somewhat in a rearward direction and are parallel.

Figure 5:
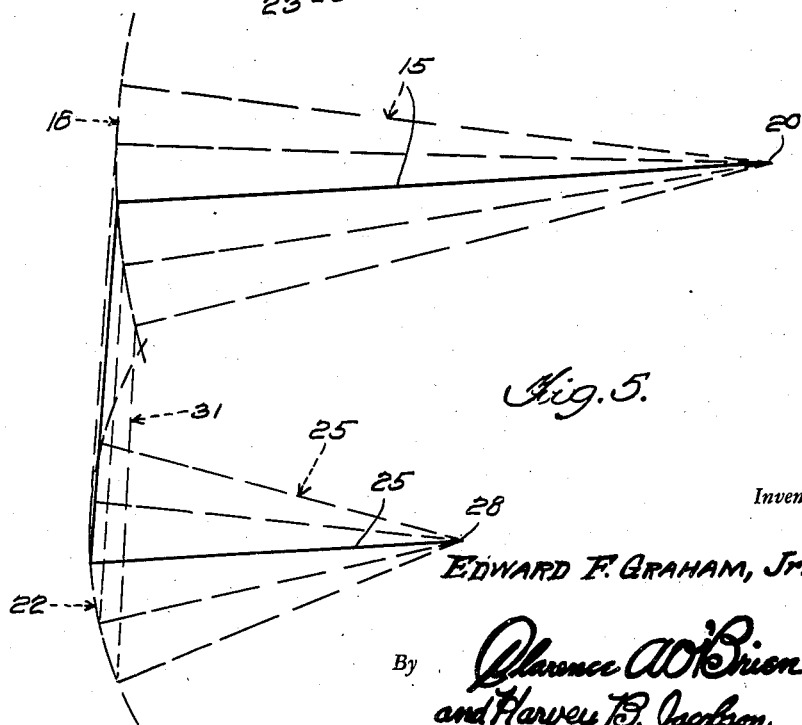
Figure 5 is a diagrammatic view showing the relative up and down movements of the upper and lower levers of the suspension and illustrating the lean of the wheel inwardly at the top produced by the suspension to counteract centrifugal force operating in an outboard direction.

The lower suspension arm 25 is very substantially shorter than the upper suspension arm 15 as indicated particularly well in Figures 3 and 5 of the drawings in order to provide the operative effects sought by the present invention. The lower suspension arm 25 constitutes the operating lever of a hydraulic or similar shock absorber whose body 26, the body being bolted or otherwise suitably fixed as indicated at 27, to the plate portion 8' of the lower chassis cross member 8, the inner ends of the side elements 14' being fixed on the rotary element 28 of the shock absorber. The axis of the rotary element 28 is substantially parallel to the axes of the joints above described.

The axes of the pins 18 and 22 at the upper and lower ends of the spindle bracket 19 are in substantially the same perpendicular plane, but the king pin 30 of the steering knuckle portion 29 of the bracket 19 has a distinct inward tilt from bottom to top, as illustrated in Figure 1 of the drawings by reason of which the wheel assembly 31 is in a substantially vertical plane or has no more than a very slight positive camber or outward tilt at the top.

Referring to Figure 5 of the drawings, the longer upper suspension arm 15 and the shorter suspension arm 25 are so proportioned in length that as a turn is executed by the vehicle, in this instance a left turn, and the weight of the vehicle and centrifugal force operates to depress the suspension arms below the normal full line positions shown, there will be relatively little change in the vertical plane of the lower end of the spindle bracket 19 and hence of the wheel assembly 31 due to downward movement of the shorter lower suspension arm 25. However, due to the greater length of the upper suspension arm 15 and the location of its pivots 20, the downward movement of the upper suspension arm draws the upper end of the spindle bracket 19 and hence the top of the wheel assembly inwardly and thereby positively counteracts the normal tendency of the wheel assembly to tilt outwardly at the top in the execution of a turn. As a result the front wheel on the outside of the turn is automatically "banked." Present experiment indicates that relative arrangement of the parts so as to "bank" the wheel about 5° is satisfactory.

It will also be noted that in the "banking" action described above the effect of moving the lower end of the spindle bracket and hence the bottom of the wheel assembly outwardly is produced.

For lighter weight vehicles the single type upper suspension arm 15ª, shown in Figures 6 and 7 may be used instead of the wishbone type of arm 15. The arm 15ª comprises a straight bar portion 32 terminating at the inner end in an angularly deflected bifurcated terminal 33 accommodating the anchor 21ª having the pin 20ª mounted between its arms. The outer end of the portion 32 terminates in a spring seat or cap 12ª to accommodate the lower end of the helical suspension spring 11, the cup 12ª having angularly spaced extensions 14ª connected at their outer ends by a yoke 16ª substantially parallel with the length of the chassis. A rearwardly deflected knuckle 17ª is mounted on the yoke 16ª and carries the pin 18ª which connects with the upper end of the spindle bracket 19.

It will be observed that due to the arrangements described above the vehicle body (not shown) can be mounted on the upper chassis side members and the upper cross member 7, with the engine (not shown) mounted below the body on the lower chassis side member and lower chassis cross member 8, thereby materially lowering the center of gravity of the vehicle and achieving the many desirable effects of a lowered center of gravity, including road stability and reduction of road shock and much greater safety and maneuverability of the vehicle at high speeds and in executing turns.

Although there are shown and described herein preferred embodiments of the invention, it is to be understood that it is not desired to limit the application of the invention thereto, except as may be required by the scope of the subjoined claims.

I claim:

1. In a vehicle wheel suspension, a chassis frame having vertically spaced transversely extending frame members, an upper substantially horizontal lever pivoted at its inner end on a substantially horizontal axis to the underside of the upper frame member at a point remote from the laterally outward end of said upper frame member, a spring seat adjacent the outward end of said upper lever, a helical spring vertically seated in said seat with its upper end supportably engaging the upper frame member, a lower substantially horizontal lever pivoted on a substantially horizontal axis at its inner end to the lower frame member at a point substantially in vertical alignment with said helical spring, the outward ends of said upper and lower levers both having substantially vertically aligned horizontal axis pivots, a wheel carrying spindle bracket comprising a vertical element having upper and lower portions thereof pivoted on said pivots, and a horizontal laterally extending wheel mounting on said vertical element.

2. A vehicle wheel suspension according to claim 1 wherein a shock absorber operatively connected to said lower lever is mounted on said chassis frame.

3. In a vehicle wheel suspension, a chassis frame having vertically spaced transversely extending frame members, an upper substantially horizontal lever pivoted at its inner end on a substantially horizontal axis to the underside of the upper frame member at a point remote from the laterally outward end of said upper frame member, a spring seat adjacent the outward end of said upper lever, a helical spring vertically seated in said seat with its upper end supportably engaging the upper frame member, a lower substantially horizontal lever pivoted on a substantially horizontal axis at its inner end to the lower frame member at a point substantially in vertical alignment with said helical spring, the outward ends of said upper and lower levers both having substantially vertically aligned horizontal axis pivots, a wheel carrying spindle bracket comprising a vertical element having upper and lower portions thereof pivoted on said pivots, and a horizontal laterally extending wheel mounting on said vertical element, said upper lever being in the form of a spread fork.

4. In a vehicle wheel suspension, a chassis frame having vertically spaced transversely extending frame members, an upper substantially horizontal lever pivoted at its inner end on a substantially horizontal axis to the underside of the upper frame member at a point remote from the laterally outward end of said upper frame member, a spring seat adjacent the outward end of said upper lever, a helical spring vertically seated in said seat with its upper end supportably engaging the upper frame member, a lower substantially horizontal lever pivoted on a substantially horizontal axis at its inner end to the lower frame member at a point substantially in vertical alignment with said helical spring, the outward ends of said upper and lower levers both having substantially vertically aligned horizontal axis pivots, a wheel carrying spindle bracket comprising a vertical element having upper and lower portions thereof pivoted on said pivots, and a horizontal laterally extending wheel mounting on said vertical element, said lower lever being in the form of a spread fork.

5. In a vehicle wheel suspension, a chassis frame having vertically spaced transversely extending frame members, an upper substantially horizontal lever pivoted at its inner end on a substantially horizontal axis to the underside of the upper frame member at a point remote from the laterally outward end of said upper frame member, a spring seat adjacent the outward end of said upper lever, a helical spring vertically seated in said seat with its upper end supportably engaging the upper frame member, a lower substantially horizontal lever pivoted on a substantially horizontal axis at its inner end to the lower frame member at a point substantially in vertical alignment with said helical spring, the outward ends of said upper and lower levers both having substantially vertically aligned horizontal axis pivots, a wheel carrying spindle bracket comprising a vertical element having upper and lower portions thereof pivoted on said pivots, and a horizontal laterally extending wheel mounting on said vertical element, said upper and lower levers being in the form of a spread fork.

6. A vehicle suspension according to claim 1 wherein said upper lever is in the form of a single bar.

7. A vehicle suspension according to claim 1 wherein said lower lever is in the form of a single bar.

8. A vehicle suspension according to claim 1 wherein said upper lever is in the form of a single bar and said lower lever is in the form of a wishbone.

9. In a vehicle wheel suspension, a chassis frame having upper and lower transversely extending frame members, an upper substantially horizontal lever pivoted on a substantially horizontal axis at its inner end to the underside of said upper frame member, a spring seat formed on said upper lever adjacent to its outer end, a helical suspension spring having it lower part mounted in said seat and having its upper end engaged with the upper frame member, a lower substantially horizontal lever, means pivoting the inner end of said lower lever on a substantially horizontal axis to said lower frame member, and a wheel carrying spindle bracket horizontally pivoted at vertically spaced points to the outer ends of said upper and lower levers.

10. A vehicle wheel suspension according to claim 9 wherein said means comprises a shock absorber having a substantially horizontal axis rotary element to which the inner end of the lower arm is fixed.

11. A vehicle wheel suspension according to claim 9 wherein the pivotal axis of said lower lever is located close to a point in vertical alignment with said helical suspension spring.

12. A vehicle wheel suspension according to claim 9 wherein the pivotal axis of said lower lever is located slightly inwardly from a point in vertical alignment with said helical suspension spring.

13. A vehicle wheel suspension according to claim 9 wherein the pivotal axis of said lower lever is located at a point between the axis of said helical spring and the pivotal axis of said upper lever.

14. A vehicle wheel suspension according to claim 9 wherein said spindle bracket comprises a laterally outward projecting means, and a steerable wheel mounting pivoted on a vertical axis on said arm.

15. A vehicle wheel suspension according to claim 9 wherein the pivotal axes of the upper and lower levers are substantially parallel.

16. A vehicle wheel suspension according to claim 9 wherein the pivotal axes of the upper and lower levers are substantially parallel and said upper and lower levers are proportioned in length whereby the upper end of said spindle bracket is shifted in an inward direction with respect to its normal position as the upper and lower levers are depressed below their normal positions as the vehicle executes a turn.

EDWARD F. GRAHAM, Jr.